United States Patent
Forrest, Jr.

(10) Patent No.: US 7,125,494 B2
(45) Date of Patent: Oct. 24, 2006

(54) METHOD OF REMOVING MATRIX FROM FIBER OPTIC CABLE

(75) Inventor: Edward J. Forrest, Jr., Marietta, GA (US)

(73) Assignee: Illinois Tool Works, Inc., Glenview, IL (US)

( * ) Notice: Subject to any disclaimer, the term of this patent is extended or adjusted under 35 U.S.C. 154(b) by 332 days.

(21) Appl. No.: 10/858,801

(22) Filed: Jun. 2, 2004

(65) Prior Publication Data

US 2005/0271343 A1   Dec. 8, 2005

(51) Int. Cl.
   *B29D 11/27* (2006.01)
(52) U.S. Cl. .......................................... 216/24
(58) Field of Classification Search ................ 216/24
   See application file for complete search history.

(56) References Cited

U.S. PATENT DOCUMENTS

| | | | |
|---|---|---|---|
| 5,522,939 | A | 6/1996 | Light, Jr. et al. |
| 6,056,847 | A * | 5/2000 | Roddy et al. ................ 156/344 |
| 6,091,875 | A | 7/2000 | Lindsay, Jr. et al. |
| 6,500,353 | B1 | 12/2002 | Blyler, Jr. et al. |
| 6,553,169 | B1 | 4/2003 | Fabian |
| 6,584,258 | B1 | 6/2003 | Thompson et al. |
| 6,594,437 | B1 | 7/2003 | Nicolas |

FOREIGN PATENT DOCUMENTS

EP   1 048 963   2/2000

OTHER PUBLICATIONS

Corning Cable Systems SRP-004-093; Issue 3; Aug. 2003 "Sheath Removal and Stripping of 8 and 12-Fiber Ribbon Interconnect Cables".
FIS Communicator; Sep. 2001; p. 4 "FIS Ribbon Fiber, Ribbon Fan-Out Assemblies and Ribbon Pulse Box".
International Search Report mailed Aug. 11, 2005 (2 pages).

* cited by examiner

*Primary Examiner*—Parviz Hassanzadeh
*Assistant Examiner*—Roberts Culbert
(74) *Attorney, Agent, or Firm*—Mark W. Croll; Donald J. Breh; Levenfeld Pearlstein, LLC

(57) ABSTRACT

A method of removing matrix from a fiber optic cable includes the steps of providing a foil layer, placing a sheet of wiping material atop the foil layer, positioning a portion of fiber optic cable coated with a matrix on the sheet of wiping material, folding the foil layer and sheet of wiping material together, spraying solvent into the folded wiping material, and confining the fiber optic cable inside the folded sheet of wiping material within the folded foil layer until the matrix dissolves. A durable folder may be used with the method to provide a portable work station and secure both the sheets of wiping material and the foil layer. A portable containing materials necessary for practicing the method of the present invention also is disclosed.

34 Claims, 5 Drawing Sheets

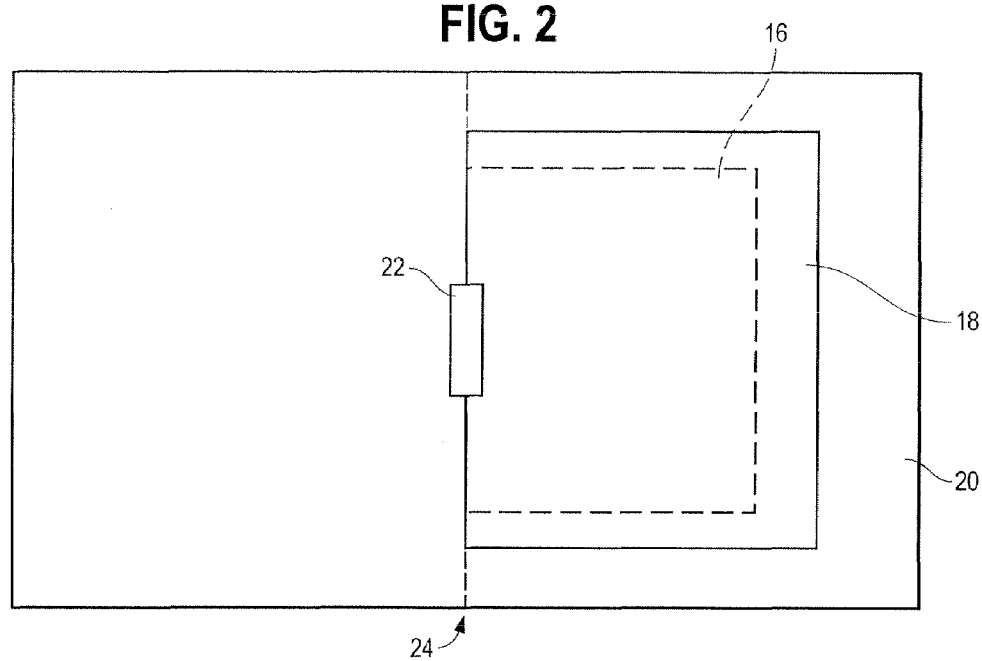
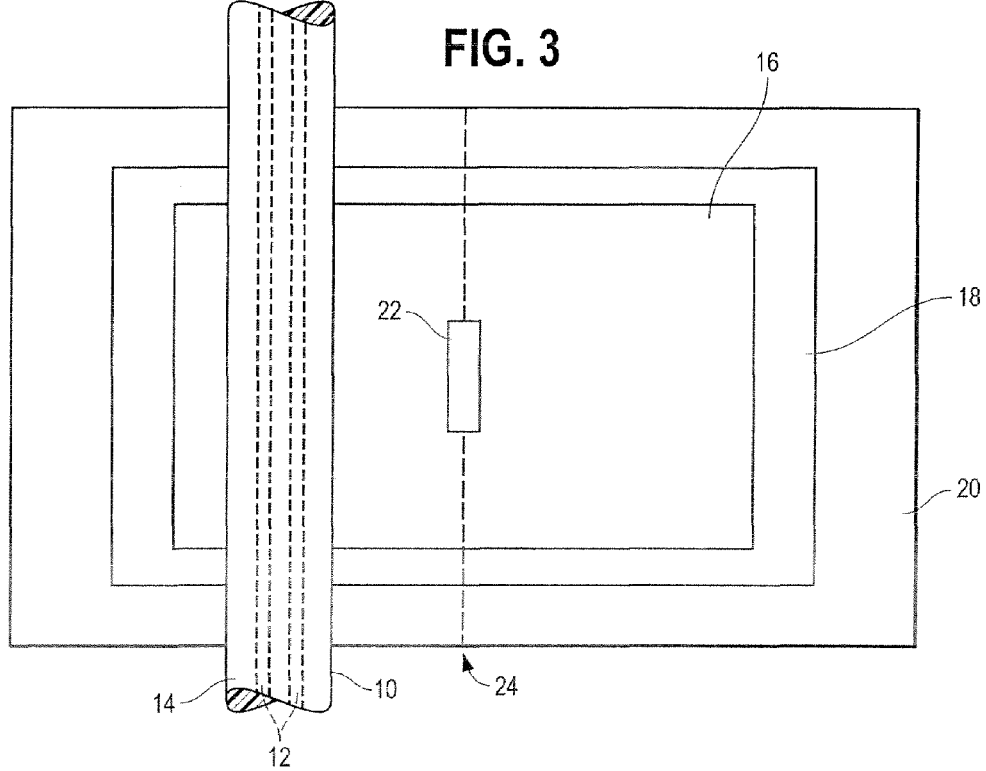

METHOD OF REMOVING MATRIX FROM FIBER OPTIC CABLE

BACKGROUND OF THE INVENTION

The present invention is directed to a method of removing matrix material from a matrix-enclosed fiber optic cable, and a device for use with the method. More particularly, the present invention pertains to a solvent capture method for removing matrix material from a fiber optic ribbon cable, and a portable, disposable kit for use with the method.

Optical fibers provide a well-known medium for conveying information in data and communications systems, such as computer and telephone networks. The light transmission capability of optical fibers is greatest when the fibers are straight, because they are subject to signal attenuation with bending. Manufacturers typically coat optical fibers, which are made of glass cores surrounded by glass cladding, with at least one layer of protective polymer matrix. This protective matrix shields the glass fibers from damage and reduces unnecessary bending.

Several optical fibers may be laid next to each other in the same plane, substantially parallel to each other, and bonded to each other with a common matrix, usually an acrylic. Such a collection of fibers, generally in the range of 2–24 individual fiber strands, is termed a fiber optic ribbon. Ribbons continue to grow in popularity because they permit increased fiber packing density within a given space. Higher packing densities allow more fibers to be placed in a given diameter cable, more efficiently utilizing existing cable ducts. Because fiber strands within a ribbon frequently are color-coded, ribbons provide easier fiber identification.

Despite the many advantages associated with fiber optic ribbon, difficulties arise when technicians need to expose individual fibers for installation, fiber splicing, repair, or maintenance. To expose individual fibers within a ribbon, technicians must first strip away the matrix surrounding the fibers that secures them to each other. The prior art describes many methods for removing matrix from fiber optic ribbon, including manual, chemical, and adhesive stripping methods, as well as peeling the matrix with a tool.

Manual stripping methods include sanding, cutting, or picking. Sanding necessarily requires the use of an abrasive substance against delicate optical fibers, resulting in the possibility of substantial damage to the fibers. Cutting and picking methods require the use of razor blades, knives, scissors, spatulas, small picks, or even fingernails. In addition to being dangerous to technicians, these methods are very time consuming and frequently cause fiber breakage. See, e.g. "Sheath Removal and Stripping of 8 and 12-Fiber Ribbon Interconnect Cables," published by Corning Cable Systems, for an example of a cutting and picking method.

Chemical stripping methods have included soaking fiber terminals or mid-spans in either ethyl alcohol or acetone. Acetone is not favored because of its strong odor, and its propensity to chemically attack other cable components. Ethyl alcohol is problematic because it is not effective on most of the ribbon matrix materials currently in use. In addition, chemical solvents used for stripping tend to evaporate or dissipate before they are able to thoroughly dissolve the matrix. One known method for chemically removing ribbon matrix includes the steps of folding three lint-free wipers in half, placing the wipers in a "snack-size" small plastic bag, spraying a solvent into the wipers, and holding a ribbon in the solvent for a set period of time, to allow the matrix to dissolve. Though the plastic bag reduces solvent evaporation, technicians find it cumbersome to have to hold the bag, the solvent container, and the optical fibers all at once. Also, while the plastic bag contains the solvent, easily spilled excess solvent remains loose in the bag, making matrix removal a particularly messy experience.

Fiber optic ribbons may be adhesively stripped by applying adhesive tape or liquid to one side of the ribbon and then laying the ribbon on a peel board, adhesive-side down. When the ribbon is pulled away from the adhesive and peel board, a portion of the matrix remains on the board, thereby exposing individual fibers. A typical example of this method is disclosed in U.S. Pat. No. 5,460,683 to Beasley, Jr. et al. Unfortunately, the adhesive stripping method often creates centerline angles in the fibers, resulting in signal attenuation. Attenuation may be particularly pronounced when the technician pulling the ribbon away from the peel board favors one side or the other, creating an uneven peel force distribution across the width of the ribbon.

Methods of peeling the matrix with tools, such as the lever device designed to be used with a peel board disclosed in U.S. Pat. No. 6,584,258 to Thompson et al., improve upon methods using adhesive alone. However, even a consistently distributed peel force cannot guarantee a reliably uniform peel. In addition, the complex construction of such compound peel tools renders them not easily portable, preventing technicians from using them for field service.

Accordingly, there exists a need for an effective method of removing matrix from fiber optic cables that thoroughly and evenly eliminates matrix without damaging the fibers. Desirably, such a method is entirely portable, useful for both field service and in-plant applications. Such a method desirably employs a chemical solvent to dissolve the matrix. Most desirably, such a method includes use of a folder that stores disposable materials used during practice of the method and provides a work station.

BRIEF SUMMARY OF THE INVENTION

A method of removing matrix from a fiber optic cable includes the steps of providing a foil layer; placing a wiping sheet atop the foil layer positioning a portion of the fiber optic cable on the wiping sheet; folding the foil layer and wiping sheet together, so that the foil layer encloses the wiping sheet, and the fiber optic cable is enveloped by both the wiping sheet and the foil layer; spraying solvent into the folded wiping sheet; and confining the fiber optic cable inside the wiping sheet until the matrix dissolves. Preferably, additional steps include resting the foil layer and wiping sheet on a portable case, and securing the folded foil layer and wiping sheet to the case with an integral binding clip.

Alternately, a method of removing matrix from a fiber optic cable includes the steps of providing a pre-folded wiping sheet enclosed by a pre-folded foil layer; positioning a portion of the fiber optic cable inside the pre-folded wiping sheet; spraying solvent into the pre-folded wiping sheet; and confining the fiber optic cable inside the pre-folded wiping sheet until the matrix dissolves. Additional steps include resting the pre-folded wiping sheet and foil layer on a portable case, and securing the pre-folded wiping sheet and foil layer to the case with an integral binding clip.

Preferably, the case is a folder made of a hard, durable material. The case may store additional foil layers and wiping sheets for future use. Preferably, the foil layer is aluminum foil, and the wiping sheets are made of non-woven material. While the case, foil layer, and wiping sheet all are disposable, the foil layer may be reused. During practice of the method, the foil layer and wiping sheet preferably are folded along a midline.

A portable kit for use with the method of the present invention also is disclosed. The kit includes a hard, durable case, which contains a plurality of foil layers and a plurality of wiping sheets. Preferably, each wiping sheet provided with the case is pre-folded and enclosed within a pre-folded layer of foil. Dividers may separate the foil layers. Most preferably, the case is a folder and has an integral binding clip, as well as instructions for use attached to an interior surface.

These and other features and advantages of the present invention will be apparent from the following detailed description, in conjunction with the appended claims.

BRIEF DESCRIPTION OF THE SEVERAL VIEWS OF THE DRAWINGS

The benefits and advantages of the present invention will become more readily apparent to those of ordinary skill in the relevant art after reviewing the following detailed description and accompanying drawings, wherein:

FIG. 2 shows materials used with the method of the present invention in a pre-folded state;

FIGS. 3–5 demonstrate performance of the method of the present invention; and

DETAILED DESCRIPTION OF THE INVENTION

Figure 1:
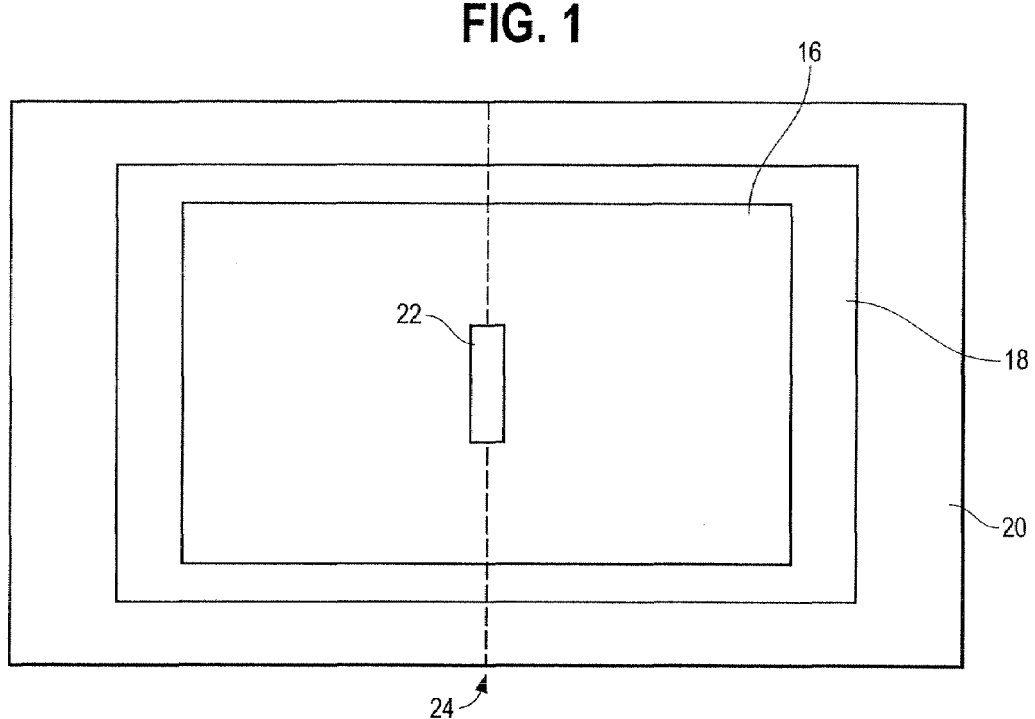
FIG. 1 is a diagrammatic view of materials used with the method of the present invention in an unfolded state.

While the present invention is susceptible of embodiment in various forms, there is shown in the drawings and will hereinafter be described a presently preferred embodiment with the understanding that the present disclosure is to be considered an exemplification of the invention and is not intended to limit the invention to the specific embodiment illustrated.

It should be further understood that the title of this section of this specification, namely, "Detailed Description Of The Invention", relates to a requirement of the United States Patent Office, and does not imply, nor should be inferred to limit the subject matter disclosed herein.

Figure 1A:
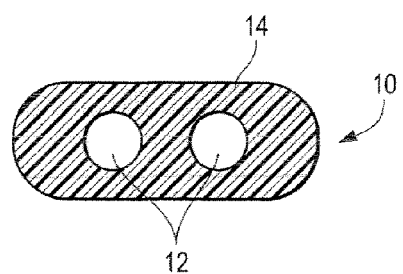
FIG. 1A is a cross-sectional view of an exemplary fiber optic cable.

Referring to the figures, and in particular FIG. 1A, there is shown a cross-sectional view of an exemplary fiber optic ribbon cable 10, with two optical fibers 12 circumscribed by ribbon matrix 14. Although most common fiber optic ribbon cables include twelve optical fibers, a two-fiber cable is used to illustrate the present invention to enhance the clarity of the drawings. Removal of the matrix 14 is the object of the present invention, and results from the following described steps.

FIG. 1 displays the first few steps of the disclosed method. A wiping sheet 16 is provided atop a foil layer 18. Preferably, the wiping sheet 16 is made of a non-woven material. Illinois Tool Works Chemtronics ("ITW Chemtronics") of Kennesaw, Ga. produces exemplary non-woven wiping sheets, Lint Free Wipers, in several sizes. The foil layer 18 is preferably aluminum foil. Suitable foil layers usable with the present method are also commercially available from ITW Chemtronics, SolventCapture Sheets.

Both the wiping sheet 16 and foil layer 18 are placed on a portable case 20. Preferably, the case 20 is a folder, such as a binder folder similar in shape to common office binder folders. The case 20 may provide storage for additional wiping sheets 16 and foil layers 18, for future use. Most preferably, the case 20 is made of a hard, durable material, such as a plastic, and includes an integral binding clip 22. Though the case 20, the wiping sheet 16, and the foil layer 18 all are disposable, the foil layer may be retained for reuse.

Figure 4:
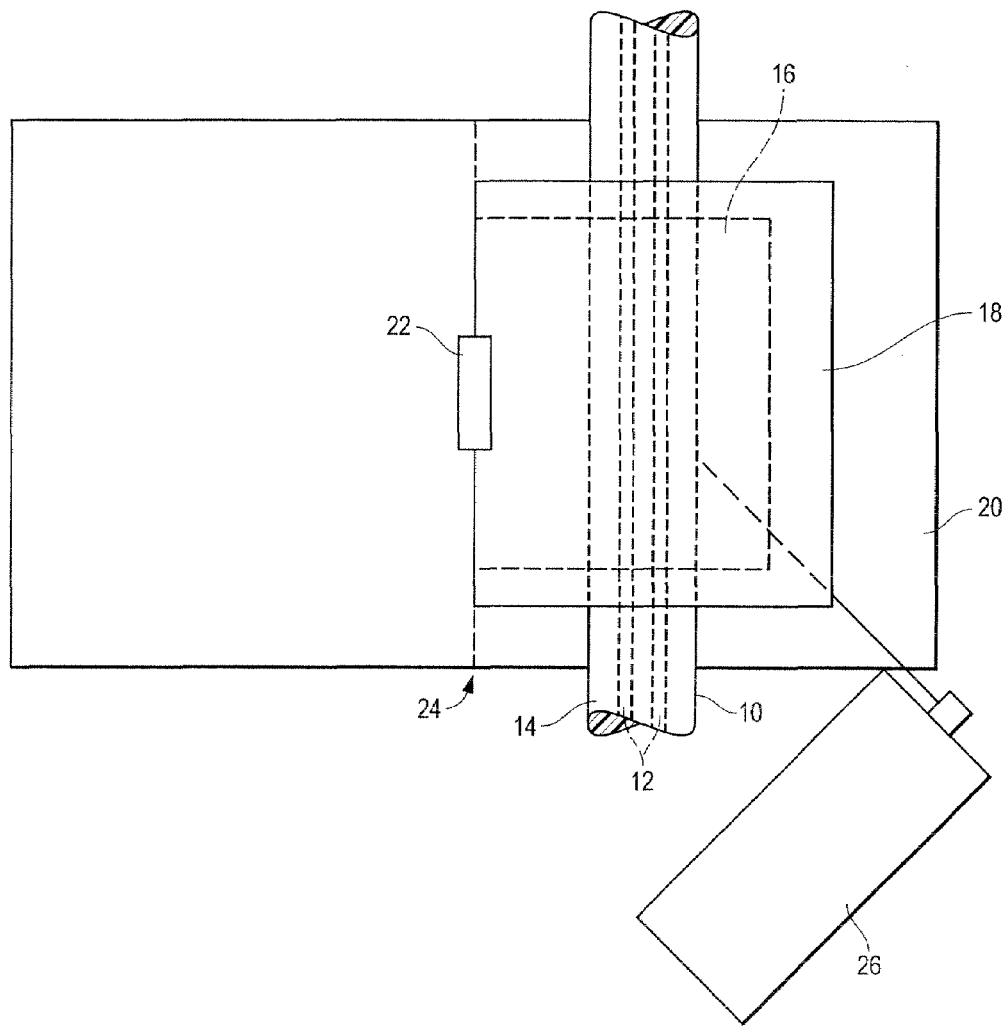

As shown in FIG. 3, a portion of the fiber optic ribbon cable 10 from which matrix 14 is to be removed is positioned on the wiping sheet 16. The foil layer 18 and the wiping sheet 16 are then folded together, as shown in FIG. 4. Preferably, the foil layer 18 and the wiping sheet 16 are folded together along a midline 24. When folded, the foil layer 18 encloses the wiping sheet 16, which in turn envelops the portion of the fiber optic cable 10. At this point, the folded foil layer 18 and wiping sheet 16 may be secured to the case 20 with its binding clip 22.

Next, a solvent 26 is sprayed into the folded wiping sheet 16. An exemplary solvent appropriate for use with the present invention is Electro-Wash® NXO, also commercially available from ITW Chemtronics. Other "not plastic safe" solvents may be used as appropriate. Preferably, approximately four milliliters (4 mL) of solvent is sprayed directly into the center of the folded wiping sheet 16. The fiber optic ribbon cable portion 10 then is confined inside the folded wiping sheet 16 and folded foil layer 18 until the matrix 14 dissolves.

Figure 5:
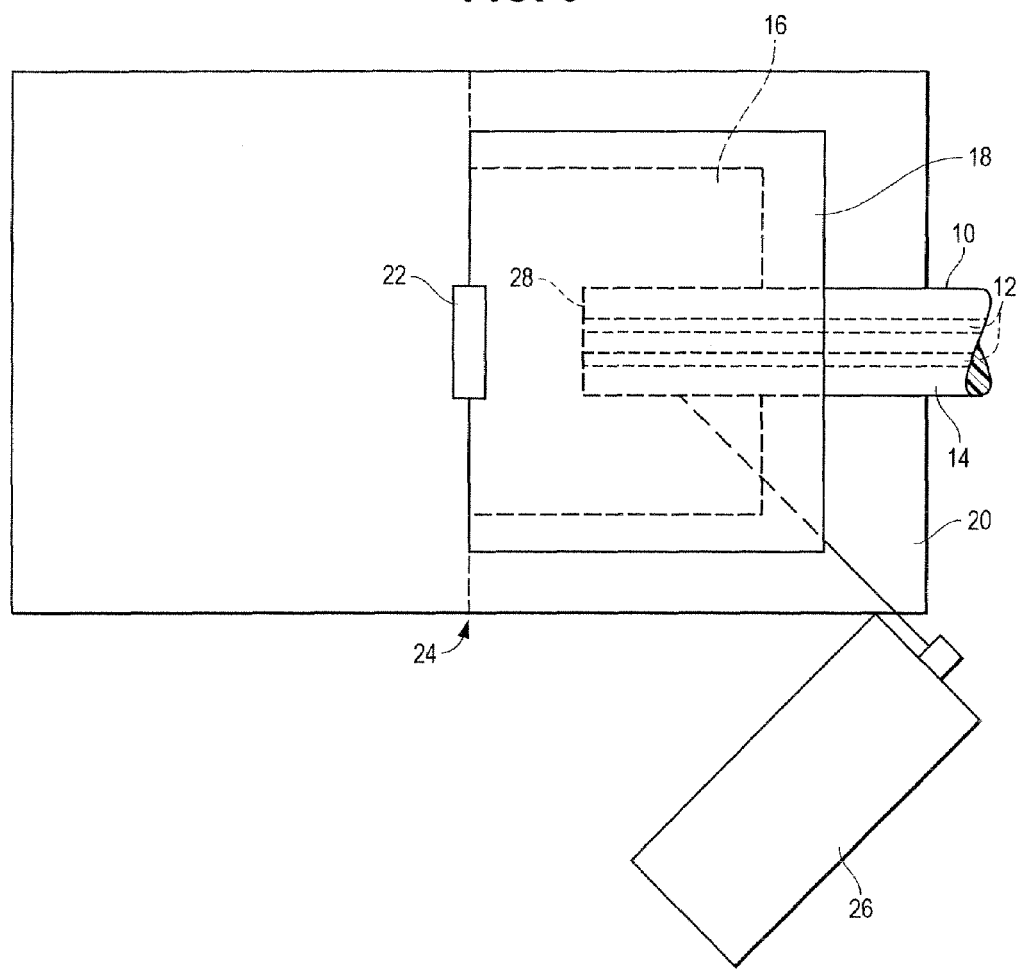

The wiping sheet 16 absorbs the solvent 26 over time, so that solvent always is in contact with the matrix 14. Because the wiping sheet 16 gradually absorbs solvent 26 over time, the cable 10 is protected from damage and color-loss. The foil layer 18 captures solvent 26 around the wiping sheet 16 and the ribbon matrix 14, preventing solvent evaporation and assisting the wiping sheets 16 with maintaining solvent contact with the ribbon matrix. The amount of time required for matrix 14 dissolution typically varies from 60–120 seconds, according to which fiber optic cable manufacturer produced the subject cable. FIG. 5 illustrates an alternate configuration of the steps shown in FIGS. 3–4, for use when ribbon matrix 14 at an end 28 of a fiber optic cable 10 requires removal.

The method described above is a preferred mode of practicing the method of the present invention. The method may be performed without a case 20 for the foil layer 18 and wiping sheet 16 to rest upon. If a case 20 is used, it need not include a binding clip 22 for securing the foil layer and wiping sheet. Use of a case 20 is preferably, however, because it provides a convenient, portable work station, allowing technicians to easily perform field service on fiber optic cables.

The method of the present invention varies slightly when the wiping sheet 16 and foil layer 18 are provided in pre-folded forms. FIG. 2 displays a pre-folded wiping sheet 16 enclosed by a pre-folded foil layer 18, both resting on a portable case 20. As before, a portion of the fiber optic cable 10 next is positioned within the pre-folded wiping sheet 16, and solvent 26 is sprayed into the wiping sheet. (See FIG. 5) The cable 10 again is confined within the wiping sheet 16 until the ribbon matrix 14 dissolves. As discussed before, the method may be performed without a case 20. If a case 20 is used, it may include a binding clip 22, for securing the pre-folded foil layer 18 and pre-folded wiping sheet 16 to the case. This alternate method varies from the prior-disclosed method mainly in that it eliminates a few preparatory steps, unnecessary because the foil layer 18 and wiping sheet 16 are pre-folded.

Figure 6:
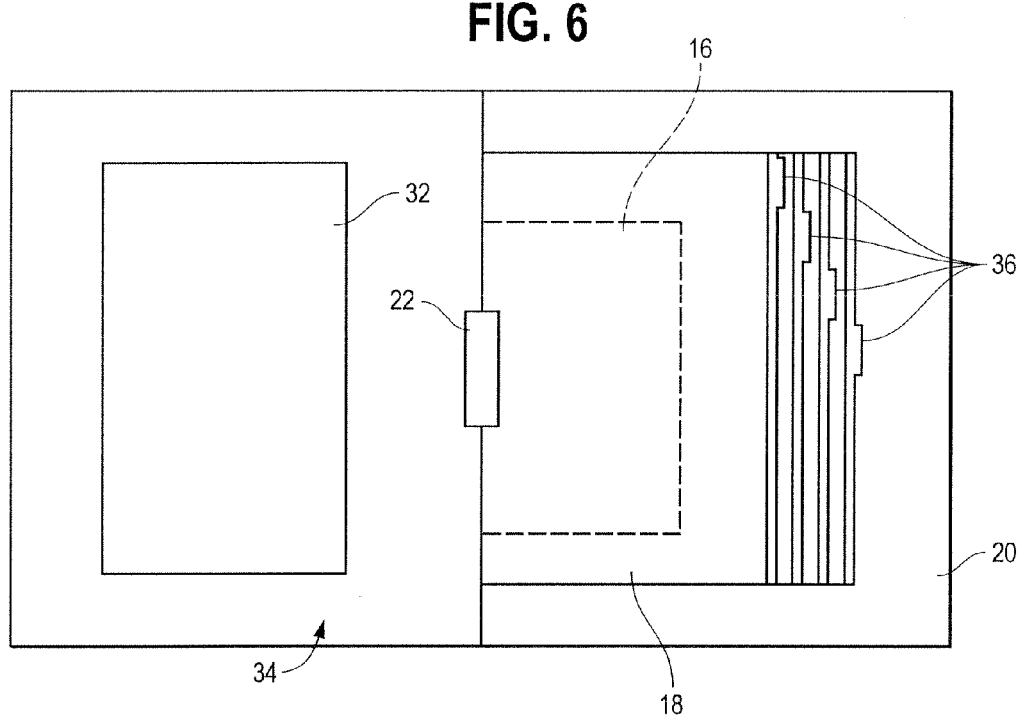
FIGS. 6 and 7 illustrate a portable kit for use with the method of the present invention.
Figure 7:
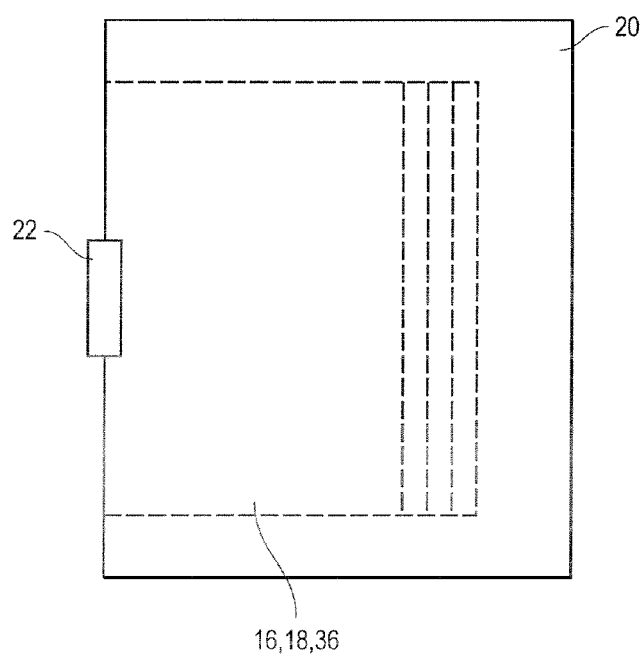

As seen in FIGS. 6 and 7, portable kit 30 for use with the method of the present invention also is disclosed. The kit 30 includes a hard, durable case 20 with an integral binding clip 22. The case 20 contains a plurality of foil layers 18 and wiping sheets 16. FIG. 6 shows the kit 30 it an open state, while FIG. 7 shows the kit in a closed state. Each wiping sheet 16 may be pre-folded, and enclosed within a pre-folded foil layer 18. Preferably, the case 20 is a folder, and includes instructions 32 attached to an interior surface 34. The foil layers 18 may be separated from each other by dividers 36.

All patents referred to herein, are hereby incorporated herein by reference, whether or not specifically done so within the text of this disclosure.

In the present disclosure, the words "a" or "an" are to be taken to include both the singular and the plural. Conversely, any reference to plural items shall, where appropriate, include the singular.

From the foregoing it will be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover by the appended claims all such modifications as fall within the scope of the claims.

What is claimed is:

1. A method of removing matrix from a fiber optic cable, comprising the steps of:
   providing a foil layer;
   placing a wiping sheet atop the foil layer;
   positioning a portion of the fiber optic cable on the wiping sheet;
   folding the foil layer and wiping sheet together, so that the foil layer encloses the wiping sheet, and the portion of the fiber optic cable is enveloped by both the wiping sheet and the foil layer;
   spraying a solvent into the folded wiping sheet; and
   confining the fiber optic cable inside the wiping sheet for a period of time sufficient for the matrix to dissolve.

2. The method of claim 1, wherein the foil layer and the wiping sheet are folded together along a midline.

3. The method of claim 1, further including the step of resting the foil layer and wiping sheet on a portable case.

4. The method of claim 3, wherein the case is a folder.

5. The method of claim 3, wherein the case includes an integral binding clip.

6. The method of claim 5, further including the step of securing the folded foil layer and wiping sheet to the case with the binding clip.

7. The method of claim 3, wherein the case stores additional foil layers and wiping sheets for future use.

8. The method of claim 3, wherein the case is made of a hard, durable material.

9. The method of claim 1, wherein the foil layer is aluminum foil.

10. The method of claim 1, wherein the wiping sheet is made of non-woven material.

11. The method of claim 3, wherein the case, the foil layer, and the wiping sheet all are disposable.

12. The method of claim 1, wherein the foil layer is reusable.

13. A method of removing matrix from a fiber optic cable, comprising the steps of:
    providing a foil layer;
    placing a wiping sheet atop the foil layer;
    resting the foil layer and wiping sheet on a portable case;
    positioning a portion of the fiber optic cable on the wiping sheet;
    folding the foil layer and wiping sheet together, so that the foil layer encloses the wiping sheet, and the portion of the fiber optic cable is enveloped by both the wiping sheet and the foil layer;
    spraying a solvent into the folded wiping sheet; and
    confining the fiber optic cable inside the folded wiping sheet for a period of time sufficient for the matrix to dissolve.

14. The method of claim 13, wherein the case is a folder.

15. The method of claim 13, wherein the case includes an integral binding clip.

16. The method of claim 15, further including the step of securing the folded foil layer and wiping sheet to the case with the binding clip.

17. The method of claim 13, wherein the foil layer and the wiping sheet are folded together along a midline.

18. The method of claim 13, wherein the case stores additional foil layers and wiping sheets for future use.

19. The method of claim 13, wherein the case is made of a hard, durable material.

20. The method of claim 13, wherein the wiping sheet is made of non-woven material.

21. The method of claim 13, wherein the case, the foil layer, and the wiping sheet all are disposable.

22. The method of claim 13, wherein the foil layer is reusable.

23. A method of removing matrix from a fiber optic cable, comprising the steps of:
    providing a foil layer;
    placing a wiping sheet atop the foil layer;
    resting the foil layer and wiping sheet on a portable case with an integral binding clip;
    positioning a portion of the fiber optic cable on the wiping sheet;
    folding the foil layer and wiping sheet together, so that the foil layer encloses the wiping sheet, and the portion of the fiber optic cable is enveloped by both the wiping sheet and the foil layer;
    securing the folded foil layer and wiping sheet to the case with the binding clip;
    spraying a solvent into the folded wiping sheet; and
    confining the fiber optic cable inside the folded wiping sheet for a period of time sufficient for the matrix to dissolve.

24. The method of claim 23, wherein the foil layer and the wiping sheet are folded together along a midline.

25. The method of claim 23, wherein the case is a folder.

26. The method of claim 23, wherein the case stores additional foil layers and wiping sheets for future use.

27. The method of claim 23, wherein the case is made of a hard, durable material.

28. The method of claim 23, wherein the wiping sheet is made of non-woven material.

29. The method of claim 23, wherein the case, the foil layer, and the wiping sheet all are disposable.

30. The method of claim 23, wherein the foil layer is reusable.

31. A method of removing matrix from a fiber optic cable, comprising the steps of:
    providing a pre-folded wiping sheet enclosed by a pre-folded foil layer;
    positioning a portion of the fiber optic cable inside the pre-folded wiping sheet;
    spraying a solvent into the pre-folded wiping sheet; and
    confining the fiber optic cable inside the pre-folded wiping sheet for a period of time sufficient for the matrix to dissolve.

32. The method of claim 31, further including the step of resting the pre-folded wiping sheet and foil layer on a portable case.

33. The method of claim 32, further including the step of securing the pre-folded wiping sheet and foil layer to the case with a binding clip integral to the case.

34. The method of claim 32, wherein the case is a folder.

* * * * *